US011969738B2

(12) United States Patent
Bucknell et al.

(10) Patent No.: US 11,969,738 B2
(45) Date of Patent: Apr. 30, 2024

(54) HYDRAULIC MANTLE ASSEMBLY SYSTEM FOR A GYRATORY ROCK CRUSHER

(71) Applicant: Technofast Industries Pty. Ltd., Brisbane (AU)

(72) Inventors: John Wentworth Bucknell, Brisbane (AU); Robert Wentworth Bucknell, Brisbane (AU)

(73) Assignee: Technofast Industries Pty. Ltd. (AU)

( * ) Notice: Subject to any disclaimer, the term of this patent is extended or adjusted under 35 U.S.C. 154(b) by 571 days.

(21) Appl. No.: 17/271,553

(22) PCT Filed: Sep. 19, 2019

(86) PCT No.: PCT/AU2019/051002
§ 371 (c)(1),
(2) Date: Feb. 25, 2021

(87) PCT Pub. No.: WO2020/073077
PCT Pub. Date: Apr. 16, 2020

(65) Prior Publication Data

US 2021/0322995 A1 Oct. 21, 2021

(30) Foreign Application Priority Data

Oct. 9, 2018 (AU) ................................ 2018247208

(51) Int. Cl.
*B02C 2/06* (2006.01)

(52) U.S. Cl.
CPC ...................................... *B02C 2/06* (2013.01)

(58) Field of Classification Search
None
See application file for complete search history.

(56) References Cited

U.S. PATENT DOCUMENTS 7,048,214 B2 5/2006 Johnson et al.
2014/0042714 A1* 2/2014 Bucknell ............... F16B 31/043 277/644

FOREIGN PATENT DOCUMENTS

AU 2015243593 B2 * 11/2018 ............. B02C 2/005
AU 2015243593 B2 11/2018
(Continued)

OTHER PUBLICATIONS

International Search Report for International Patent Application No. PCT/AU2019/051002 dated Nov. 25, 2019.

*Primary Examiner* — Adam J Eiseman
*Assistant Examiner* — Jared O Brown
(74) *Attorney, Agent, or Firm* — Endurance Law Group PLC; James R. Yee

(57) ABSTRACT

A hydraulic mantle system for a gyratory rock crusher enables the safe, quick and efficient replacement of a worn or deformed mantle. The system includes a main shaft, an annular nut, an annular hydraulic piston and an annular mantle. The main shaft has a flange and external threads adjacent the flange. The annular nut body has side surfaces and internal threads that are threaded onto the external threads of the main shaft. The annular hydraulic piston has side surfaces that slidingly engage the side surfaces of the annular nut body. The annular mantle has an upper neck portion and a lower edge portion. The main shaft extends through the upper neck portion. The upper neck portion of the annular mantle is compressed between the flange of the main shaft and the annular hydraulic piston.

11 Claims, 5 Drawing Sheets

(56) References Cited

FOREIGN PATENT DOCUMENTS

| | | | | |
|---|---|---|---|---|
| EP | 2929940 | A1 | | 10/2015 |
| JP | H06170258 | A | | 6/1994 |
| JP | 2012250306 | A | * | 12/2012 |
| WO | 2012171778 | A2 | | 12/2012 |

* cited by examiner

HYDRAULIC MANTLE ASSEMBLY SYSTEM FOR A GYRATORY ROCK CRUSHER

CROSS-REFERENCE TO RELATED APPLICATIONS

This application is the National Stage entry of International Patent Application No. PCT/AU2019/051002, filed Sep. 19, 2019, which claims priority to and all the advantages of Australian Patent Application No. 2018247208, filed Oct. 9, 2018, the entire contents of which are hereby incorporated by reference.

FIELD OF THE INVENTION

The present invention relates generally to systems and methods for assembling a mantle in a gyratory rock crusher, and in particular to systems and methods for applying tensile force during assembly and disassembly of gyratory rock crusher mantle systems.

BACKGROUND

Rock crushers are commonly used in mining applications in order to reduce large rocks to smaller rocks, gravel or dust, depending on the rock type and required end use. A gyratory rock crusher is a popular type of crusher that employs a funnelled crushing chamber, known as a concave, that guides input rock to a centre hole. A mantle system is suspended inside the centre hole and includes a main shaft and a mantle attached to the main shaft.

The main shaft is generally connected to an actuating system below the crushing chamber, which through the use of belts or eccentric gears swings the main shaft and mantle through a gyratory motion adjacent lower edges of the crushing chamber. Rocks are progressively broken to smaller sizes before passing through the aperture formed between the concave and the mantle.

Gyratory rock crushers are often huge machines, capable of processing over 8000 tonnes of material per hour. Accordingly, the mantle and crushing chamber generally must be extremely robust, including heavy-duty wear resistant plates.

The mantle is generally fixed to the main shaft by a large threaded nut, known as the head nut, sometimes exceeding 1200 mm in diameter, which is threaded onto the main shaft. During normal use, both the concave, mantle and head nut can suffer significant wear and require replacement. The action of crushing rocks against the crushing chamber generally plastically deforms and axially lengthens the mantle, which adds significant tension to the head nut.

Due to the plastic deformation in the system, loosening the head nut and replacing the mantle is generally a time consuming, dangerous and expensive process. The associated down-time and loss of productivity of the rock crusher during the mantle replacement process often adds greatly to the overall cost of the process.

Further, due to their large size the head nuts are typically difficult to tighten and loosen in the confined space within the body of the gyratory crusher. Nut removal techniques thus include welding protrusions onto the periphery of the head nut and beating the nut with hammers, battering rams or even rock breaker tools on an excavator arm. Other head nut removal processes involve the use of oxy-acetylene cutting torches to burn through a “torch ring” positioned under the head nut, which collapses the ring and relieves the load on the head nut. Such practices are difficult and dangerous owing to the conditions and spatial restrictions in which the operations must be performed. Often epoxy setting compounds are used to bed the mantle to the inner cone. The use of flame cutting torches can ignite the compounds, thereby creating a fire danger and health hazard.

There is therefore a need for an improved mantle assembly system for a gyratory rock crusher.

OBJECT OF THE INVENTION

It is an object of the present invention to overcome and/or alleviate one or more of the disadvantages of the prior art or provide the consumer with a useful or commercial choice.

SUMMARY OF THE INVENTION

In a first aspect, although it need not be the only or the broadest aspect, the invention resides in a hydraulic mantle system for a gyratory rock crusher, the system comprising:

- a main shaft having a flange and external threads adjacent the flange;
- an annular nut body having side surfaces and having internal threads that are threaded onto the external threads of the main shaft;
  - an annular hydraulic piston having side surfaces that slidingly engage the side surfaces of the annular nut body; and
  - an annular mantle having an upper neck portion and a lower edge portion, the main shaft extending through the upper neck portion;
  - wherein the upper neck portion of the annular mantle is compressed between the flange of the main shaft and the annular hydraulic piston.

Preferably, the system further comprises an annular sacrificial cover positioned over the annular nut body.

Preferably, a top face of the annular nut body comprises a plurality of threaded through holes that each receive a lock screw.

Preferably, a top face of the annular hydraulic piston comprises a plurality of blind holes that each receive a distal end of a lock screw.

Preferably, a high pressure inner seal and a high pressure outer seal provide a hydraulic seal between the annular nut body and the annular hydraulic piston.

Preferably, a lower end of the annular hydraulic piston defines a recess that receives an upper edge of the annular mantle.

Preferably, an outer diameter of the upper edge of the annular mantle is greater than an outer diameter of a side surface of the annular nut body against which the hydraulic piston engages.

Preferably, an inner diameter of the upper edge of the annular mantle is greater than an outer diameter of a side surface of the annular nut body against which the hydraulic piston engages.

Preferably, the top face of the annular nut body comprises a plurality of hydraulic fluid access holes.

Preferably, the plurality of hydraulic fluid access holes are each sealed with a plug, which plugs are replaceable with a hydraulic fluid nipple and adapter.

Preferably, O-rings separate outer sides of the annular nut body and hydraulic piston against inner sides of the sacrificial cover.

Preferably, the sacrificial cover is bolted to the annular nut body.

Preferably, a spanner is boltable to the top face of the annular nut body.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE PREFERRED EMBODIMENT

Figure 1:
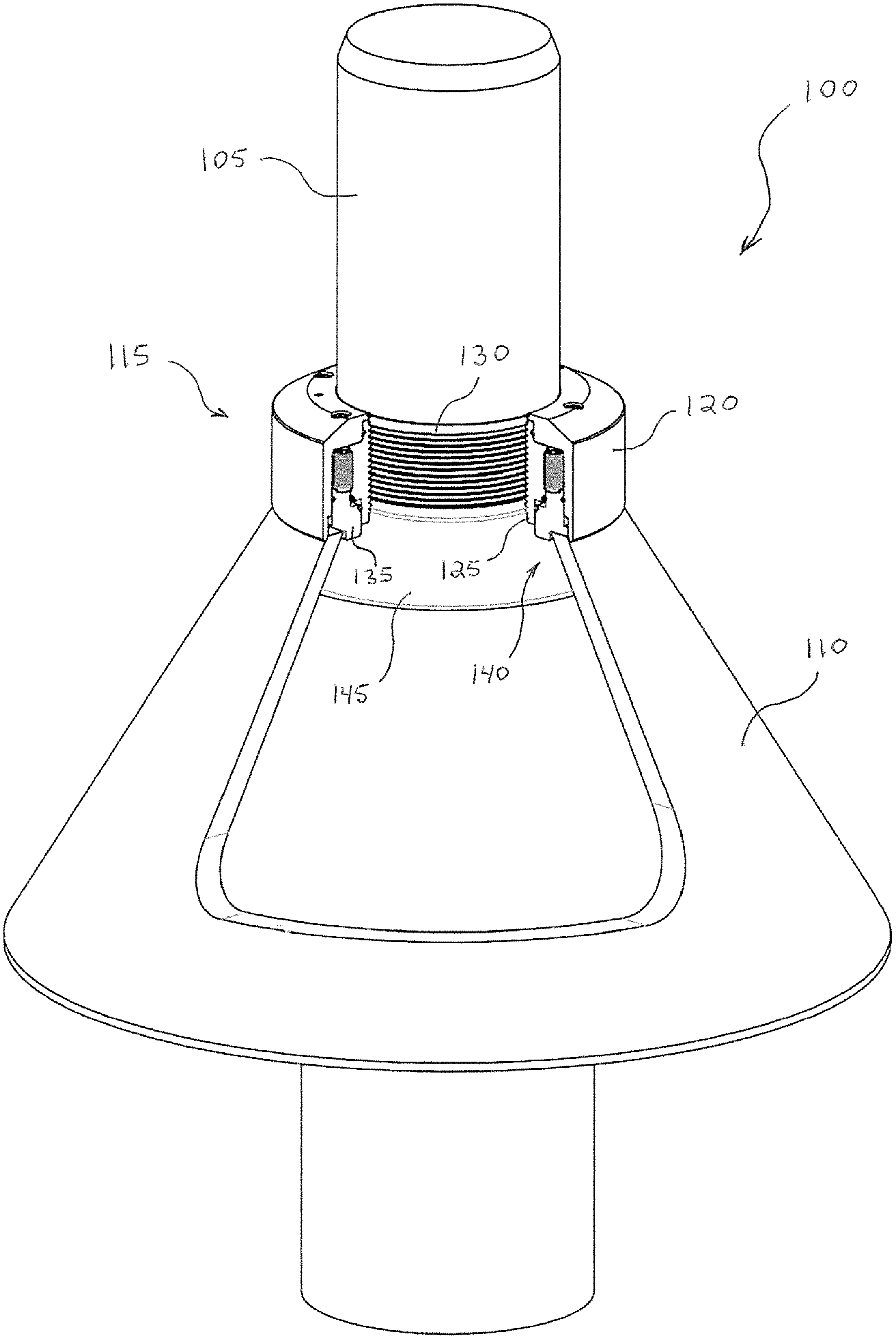
FIG. 1 is a partially cut-away side perspective view of an assembled mantle system for a gyratory rock crusher, according to some embodiments of the present invention.

The present invention relates to a hydraulic mantle system for a hydraulic rock crusher. Elements of the invention are illustrated in concise outline form in the drawings, showing only those specific details that are necessary for understanding the embodiments of the present invention, but so as not to clutter the disclosure with excessive detail that will be obvious to those of ordinary skill in the art in light of the present description.

In this patent specification, adjectives such as first and second, left and right, above and below, top and bottom, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the present invention is defined as a hydraulic mantle system for a gyratory rock crusher, the system comprising:

- a main shaft having a flange and external threads adjacent the flange;
- an annular nut body having side surfaces and having internal threads that are threaded onto the external threads of the main shaft;
  - an annular hydraulic piston having side surfaces that slidingly engage the side surfaces of the annular nut body; and
  - an annular mantle having an upper neck portion and a lower edge portion, the main shaft extending through the upper neck portion;
  - wherein the upper neck portion of the annular mantle is compressed between the flange of the main shaft and the annular hydraulic piston.

Advantages of some embodiments of the present invention include the ability to safely, quickly and efficiently replace a worn and deformed mantle of a gyratory rock crusher. Workers are able to operate safely in the confined space adjacent to the rock crusher main shaft, and without resorting to the "heating and beating" techniques of the prior art, which techniques often required use of a cutting torch to cut through a damaged and deformed nut that fastened a worn rock crusher mantle to a main shaft. By employing a hydraulic tightening and loosening process, even severely damaged and deformed mantles can be readily removed and replaced.

FIG. 1 is a partially cut-away side perspective view of an assembled mantle system 100 for a gyratory rock crusher, according to some embodiments of the present invention. The system 100 includes a main shaft 105, a mantle 110, and a hydraulic nut assembly 115.

The hydraulic nut assembly 115 comprises a sacrificial cover 120 secured to an annular nut body 125. The annular nut body 125 is threaded onto external threads 130 of the main shaft 105. An annular hydraulic piston 135 slidingly engages with the annular nut body 125. An upper neck portion 140 of the mantle is compressed between a flange 145 of the main shaft 105 and the annular hydraulic piston 135.

As will be understood by those skilled in the art, according to some embodiments the flange 145 can comprise various geometries or components against which the upper neck portion of a mantle is compressed. For example, the main shafts of some crushers include a through bolt and multiple tapered components, which are retained by their weight and the tensioning of a head nut.

Figure 2:
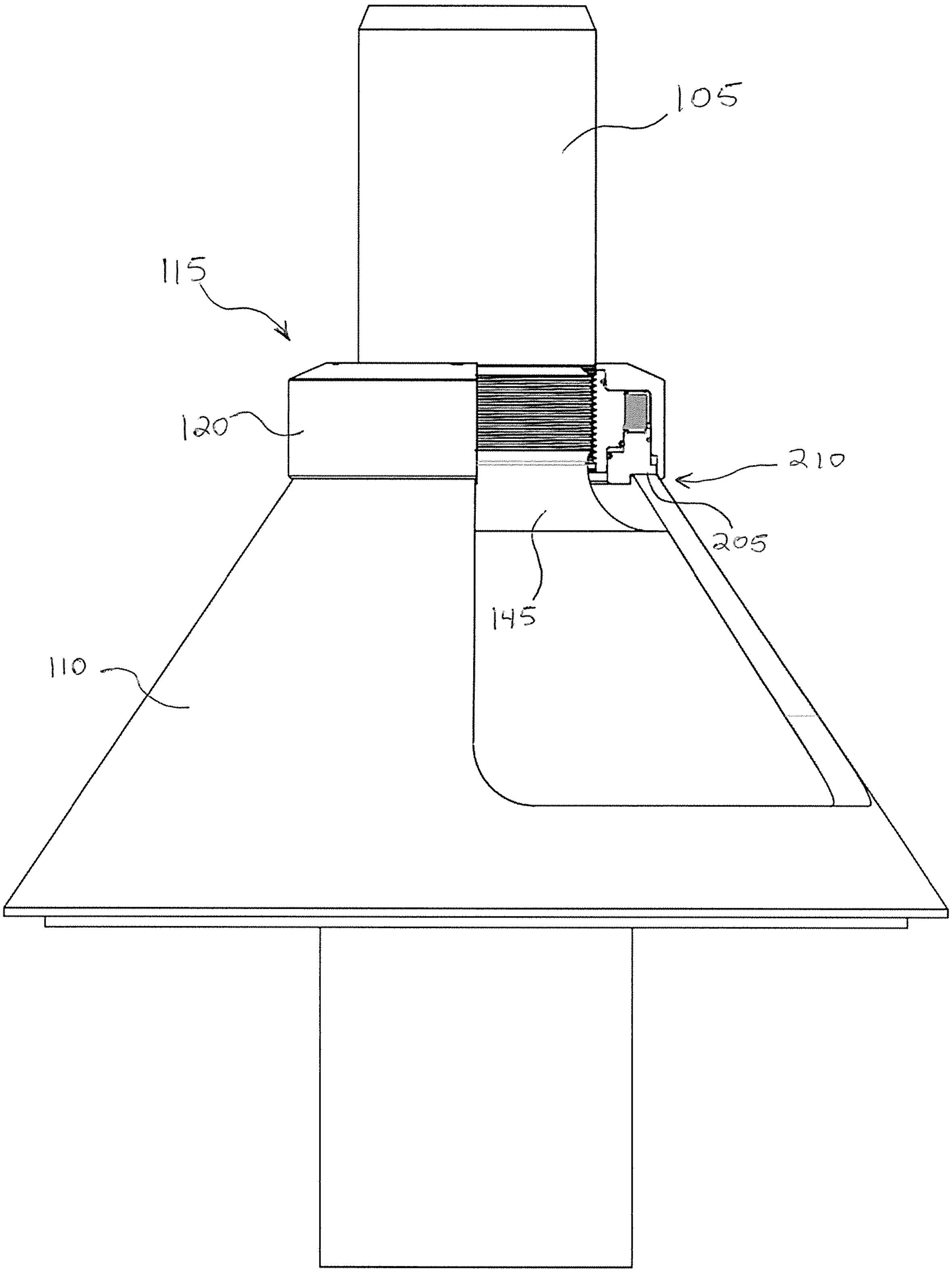
FIG. 2 is a partially cut-away side view of the assembled mantle system of FIG. 1.

FIG. 2 is a partially cut-away side view of the assembled mantle system 100. As shown, an upper edge 205 of the mantle 110 is received in a lower recess 210 of the hydraulic piston 135.

Figure 3:
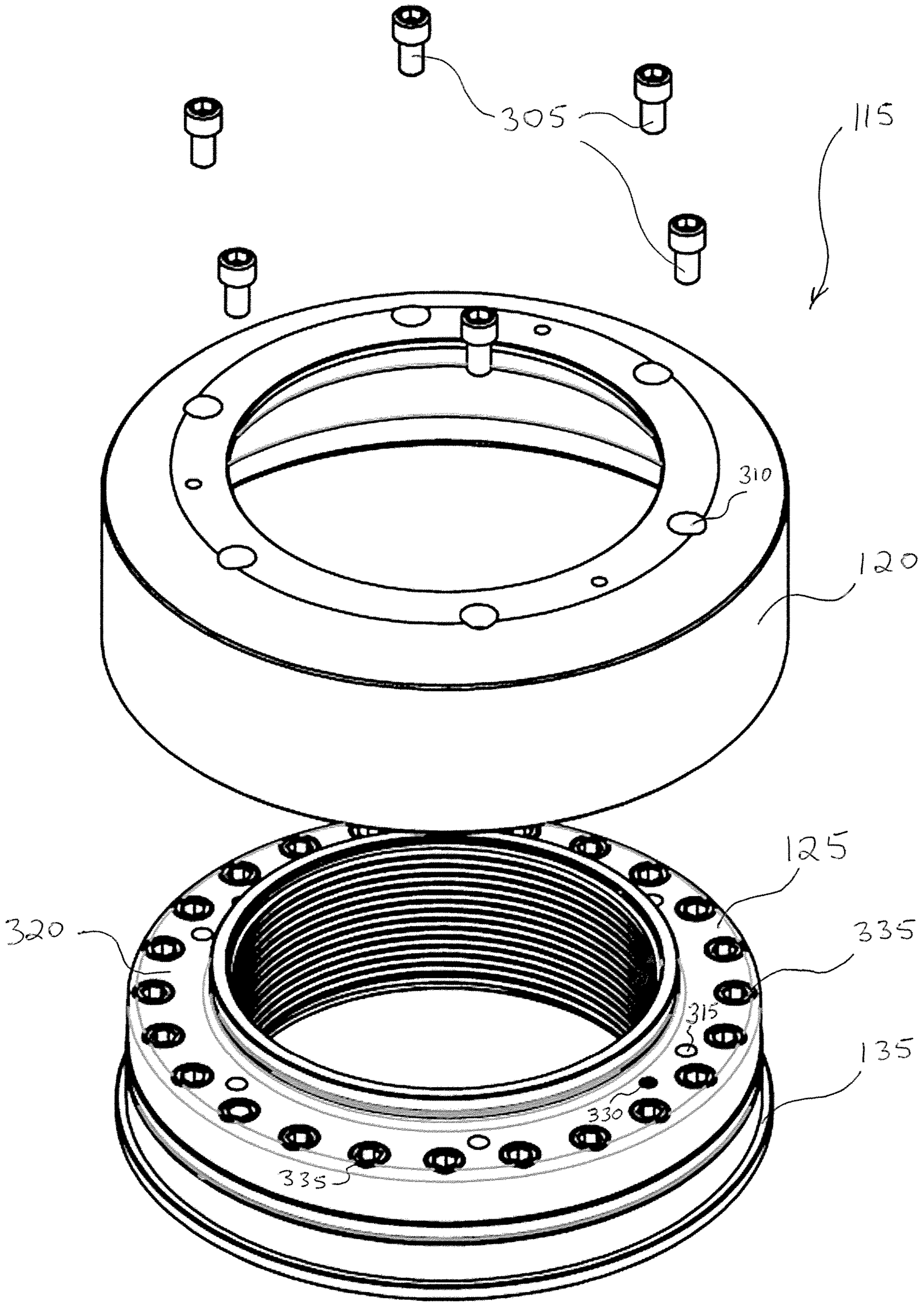
FIG. 3 is a top exploded perspective view of the hydraulic nut assembly of the mantle system of FIG. 1.

FIG. 3 is a top exploded perspective view of the hydraulic nut assembly 115. To secure the sacrificial cover 120 in place, socket screws 305 extend through holes 310 in the sacrificial cover 120 and are threaded into holes 315 on a top face 320 of the annular nut body 125.

The top face 320 also includes hydraulic access holes 330, which are sealed for example by a plug. The access holes 330 permit the passage of a charging medium (usually oil) during assembly and disassembly. The holes 330 are plugged during operation of the crusher. Further, a plurality of lock screws 335 are threaded through the top face 320 and around a perimeter of the top face 320.

Figure 4:
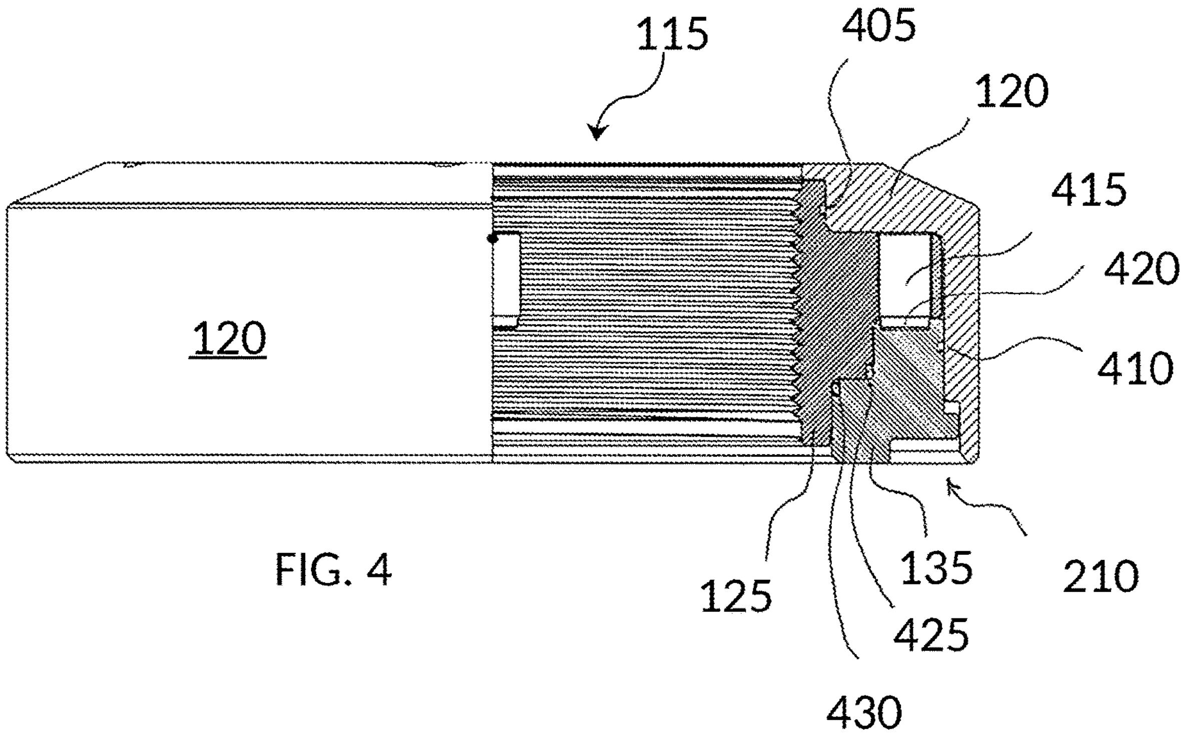
FIG. 4 is a partially cut-away side view of the hydraulic nut assembly of the mantle system of FIG. 1.

FIG. 4 is a partially cut-away side view of the hydraulic nut assembly 115. The lower recess 210 of the hydraulic piston 135 is clearly shown. Also shown is a threaded hole 415 in the annular nut body 125 for a lock screw 335, and a blind hole 420 in the hydraulic piston 135 that receives a distal end of a lock screw 335.

An upper O-ring 405 seals an outer side of the annular nut body against an inner side of the sacrificial cover 120. And a lower O-ring 410 seals an outer side of the hydraulic piston 135 against an inner side of the sacrificial cover 120.

Also, a high pressure inner seal 425 and a high pressure outer seal 430 provide a hydraulic seal between the annular nut body 125 and the annular hydraulic piston 135. The inner seal 425 is fixed to the annular nut body 125 and slidingly engages an inner surface of the hydraulic piston 135 during axial displacement of the hydraulic piston 135; whereas the outer seal 430 is fixed to the hydraulic piston and slidingly engages an outer surface of the annular nut body 125 during axial displacement of the hydraulic piston 135. The axial height of the outer surfaces of the annular nut body 125 that engage the inner surfaces of the hydraulic piston 135 define a maximum stroke of the hydraulic nut assembly 115, which maximum stroke is limited for example in some embodiments to 12 mm.

The hydraulic piston 135 is illustrated in FIG. 4 at zero stroke. In use, as the piston 135 moves axially away from the annular nut body 125, the high pressure inner seal 425 and outer seal 430 seal hydraulic fluid inside a toroidal piston cavity.

Figure 5:
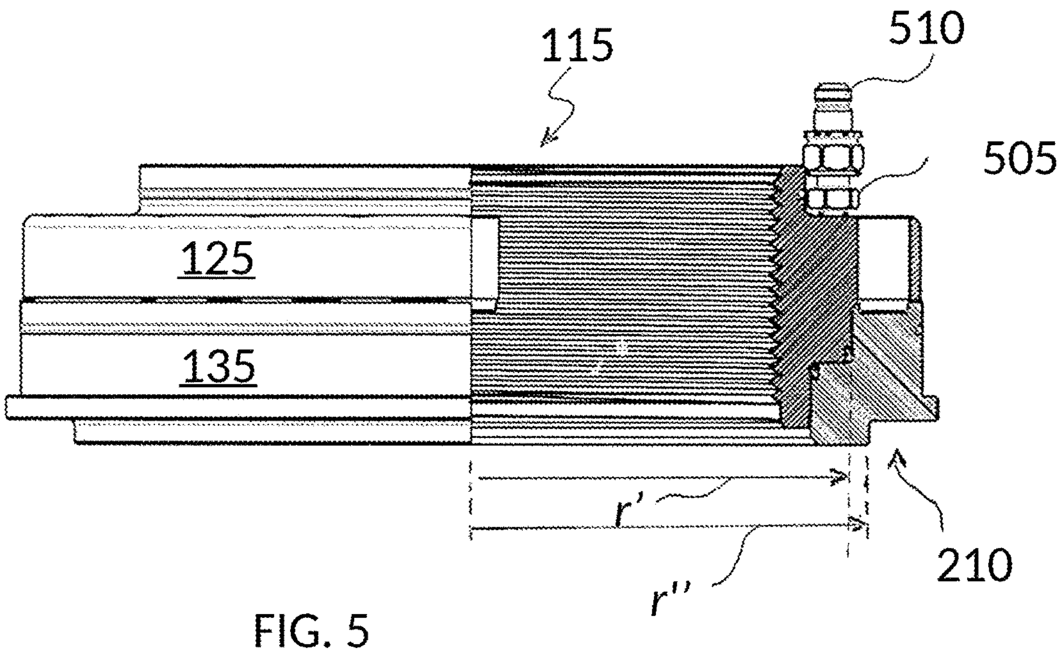
FIG. 5 is a further partially cut-away side view of the hydraulic nut assembly of the mantle system of FIG. 1, but with the sacrificial cover removed.

FIG. 5 is a further partially cut-away side view of the hydraulic nut assembly 115, but with the sacrificial cover 120 removed. An adapter 505 is shown threaded onto the annular nut body 125, and a hydraulic fluid nipple 510 is shown threaded onto the adapter 505.

According to some embodiments, an outer diameter of the upper edge 205 of the annular mantle 110 is greater than an outer diameter of a side surface of the annular nut body 125 against which the hydraulic piston 135 engages.

Further, according to some embodiments, an inner diameter of the upper edge 205 of the annular mantle 110 is greater than an outer diameter of a side surface of the annular nut body 125 against which the hydraulic piston 135 engages. That is illustrated for example in FIG. 5, where a radius r' of an outer side surface of the annular nut body 125 engages with an inner side surface of the annular hydraulic piston 135, and where a radius r" of an outer side surface of the lower recess 210 of the hydraulic piston 135 engages with the inner surface of the upper edge 205 of the annular mantle 110, and where r">r'.

The relative dimensions described above assist in providing a direct transfer of loads from the lock screws 335 to the upper edge 205 of the annular mantle 110, and assist in easy disassembly of the mantle system 100, even after the mantle 110 has suffered significant wear and deformation.

Figure 6:
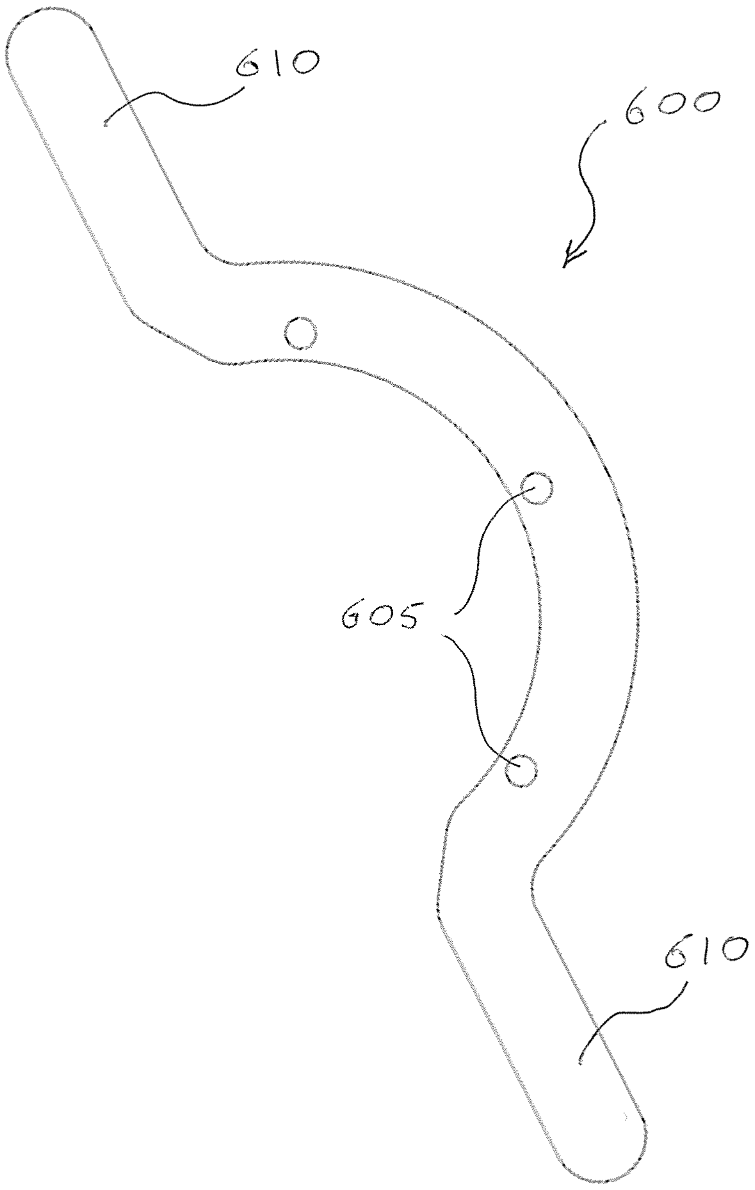
FIG. 6 is a top view of a spanner, according to an embodiment of the present invention.

FIG. 6 is a top view of a spanner 600, according to an embodiment of the present invention. Bolts (not shown) can be placed through the holes 605 in the spanner 600 and threaded into the holes 315 on the top face 320 of the annular nut body 125. That enables the annular nut body 125 to be easily rotated by exerting force against the handles 610 of the spanner 600.

During assembly of the mantle system 100, the mantle 110 is first placed over the main shaft 105 and against the flange 145. To provide access to and enable turning of the annular nut body 125, the sacrificial cover 120 is then removed from the hydraulic nut assembly 115 by unbolting the socket screws 305 from the annular nut body 125 and sliding the cover 120 upwards.

Next, the spanner 600 is bolted to the top face 320 of the annular nut body 125. By applying force on the handles 610 of the spanner 600, the nut body 125 is screwed down tightly on the external threads 130 of the main shaft 105, which presses the hydraulic piston 135 against an upper edge 205 of the mantle 110. The nut body 125 is then backed off by ¼ to ½ turn to prevent hydraulic locking of the hydraulic nut assembly 115.

Next a plug is removed from a hydraulic access hole 330, and the adapter 550 and hydraulic fluid nipple 510 are fitted to the top face 320. The spanner 600 is then removed and any lock screws 335 which were previously removed to enable seating of the spanner 600 are replaced.

The hydraulic fluid nipple 510 is then connected to a hydraulic pump (not shown). The pump is then operated to slowly charge the hydraulic nut assembly 115 to an appropriate pressure, such as for example 10,000 psi or 700 bar.

After the appropriate pressure is reached, the lock screws 335 are manually screwed down onto the hydraulic piston 135. A relief valve on the pump is then opened slowly to reduce the hydraulic pressure in the hydraulic nut assembly 115, which transfers the tensile force generated hydraulically onto the lock screws 335. The pump is then disconnected from the hydraulic fluid nipple 510 and the adapter 505 and nipple 510 are removed and the hydraulic access hole 330 is sealed with a suitable threaded plug.

Finally, the sacrificial cover 120 is reassembled on the hydraulic nut assembly 115 and bolted to the annular nut body 125.

Disassembly of the mantle system 100 is essentially the reverse of the above with the sacrificial cover 120 removed to permit connection of the hydraulic apparatus and charging to release load on the lock screws 335. With these backed off, release of charge pressure will de-tension the assembly. Should the hydraulic apparatus fail for any reason, the lock screws 335 can be incrementally backed off to release the load manually, thus providing a further degree of safety and assured function.

Those skilled in the art will appreciate that various components of embodiments of the present invention can be made of various high strength materials, including steel, steel alloys and other metal alloys.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A hydraulic mantle system for a gyratory rock crusher, the system comprising:

a main shaft having a flange and external threads adjacent the flange; an annular nut body having side surfaces and having internal threads that are threaded onto the external threads of the main shaft;

an annular hydraulic piston having side surfaces that slidingly engage the side surfaces of the annular nut body;

an annular mantle having an upper neck portion and a lower edge portion, the main shaft extending through the upper neck portion; and an annular sacrificial cover positioned over the annular nut body, wherein the sacrificial cover is bolted to the annular nut body, wherein the upper neck portion of the annular mantle is compressed between the flange of the main shaft and the annular hydraulic piston.

2. The system of claim 1, wherein a top face of the annular nut body comprises a plurality of threaded through holes that each receive a lock screw.

3. The system of claim 1, wherein a top face of the annular hydraulic piston comprises a plurality of blind holes that each receive a distal end of a lock screw.

4. The system of claim 1, wherein an inner seal and an outer seal provide a hydraulic seal between the annular nut body and the annular hydraulic piston.

5. The system of claim 1, wherein an outer diameter of an upper edge of the annular mantle is greater than an outer diameter of a side surface of the annular nut body against which the hydraulic piston engages.

6. The system of claim 1, wherein an inner diameter of an upper edge of the annular mantle is greater than an outer diameter of a side surface of the annular nut body against which the hydraulic piston engages.

7. The system of claim 1, wherein a top face of the annular nut body comprises a plurality of hydraulic fluid access holes.

8. The system of claim 7, wherein the plurality of hydraulic fluid access holes are each sealed with a plug, which plugs are replaceable with a hydraulic fluid nipple and adapter.

9. The system of claim 1, further comprising a spanner boltable to a top face of the annular nut body.

10. A hydraulic mantle system for a gyratory rock crusher system the system comprising:

a main shaft having a flange and external threads adjacent the flange;

an annular nut body having side surfaces and having internal threads that are threaded onto the external threads of the main shaft;

an annular hydraulic piston having side surfaces that slidingly engage the side surfaces of the annular nut body; and an annular mantle having an upper neck portion and a lower edge portion, the main shaft extending through the upper neck portion, wherein the upper neck portion of the annular mantle is compressed between the flange of the main shaft and the annular hydraulic piston, wherein a lower end of the annular hydraulic piston defines a recess that receives an upper edge of the annular mantle.

11. A hydraulic mantle system for a gyratory rock crusher system of the system comprising:

a main shaft having a flange and external threads adjacent the flange;

an annular nut body having side surfaces and having internal threads that are threaded onto the external threads of the main shaft;

an annular hydraulic piston having side surfaces that slidingly engage the side surfaces of the annular nut body; and an annular mantle having an upper neck portion and a lower edge portion, the main shaft extending through the upper neck portion, wherein the upper neck portion of the annular mantle is compressed between the flange of the main shaft and the annular hydraulic piston, wherein O-rings seal outer sides of the annular nut body and the hydraulic piston against inner sides of the sacrificial cover.

* * * * *